(12) United States Patent
Rodriguez

(10) Patent No.: US 6,176,512 B1
(45) Date of Patent: Jan. 23, 2001

(54) APPARATUS FOR DIRECTING THE FLOW OF INFLATION FLUID INTO AN AIR BAG

(75) Inventor: Alberto Rodriguez, Rochester Hills, MI (US)

(73) Assignee: TRW Vehicle Safety Systems Inc., Lyndhurst, OH (US)

( * ) Notice: Under 35 U.S.C. 154(b), the term of this patent shall be extended for 0 days.

(21) Appl. No.: 09/422,604

(22) Filed: Oct. 21, 1999

(51) Int. Cl.⁷ .................................................. B60R 21/16
(52) U.S. Cl. .................................. 280/728.2; 280/728.1; 280/740; 280/742
(58) Field of Search ................................ 280/742, 743.1, 280/743.2, 728.2, 728.1, 736, 740

(56) References Cited

U.S. PATENT DOCUMENTS

| | | |
|---|---|---|
| 5,172,933 | 12/1992 | Strasser . |
| 5,487,560 | 1/1996 | Emambakhsh . |
| 5,494,314 | 2/1996 | Kriska et al. . |
| 5,848,805 | * 12/1998 | Sogi et al. ............................ 280/742 |
| 5,857,696 | * 1/1999 | Inoue et al. ........................ 280/743.1 |
| 5,951,044 | * 9/1999 | Berger ................................ 280/743.1 |

* cited by examiner

Primary Examiner—Eric Culbreth
(74) Attorney, Agent, or Firm—Tarolli, Sundheim, Covell, Tummino & Szabo L.L.P.

(57) ABSTRACT

An apparatus for helping to protect a vehicle occupant in a vehicle collision comprises an inflatable vehicle occupant protection device (12) having a mouth section (18) with a first opening (140) through which inflation fluid flows to inflate the occupant protection device. An inflator (16) provides the inflation fluid. A member (80) is located between the mouth section (18) and the inflator (16). The member (80) has a second opening (82) for directing the inflation fluid from the inflator (16) into the first opening (140). The second opening (82) has first and second portions (170 and 172). The second portion (172) of the second opening (82) overlies the first opening (140) in the mouth section (18). Inflation fluid from the inflator (16) thus enters the occupant protection device by flowing through the second portion (172) and through the first opening (140). The mouth section (18) includes a deflector part (160) blocking inflation fluid flow through the first portion (170) of the second opening (82) in the member (80) into the occupant protection device (12).

5 Claims, 4 Drawing Sheets

APPARATUS FOR DIRECTING THE FLOW OF INFLATION FLUID INTO AN AIR BAG

TECHNICAL FIELD

The present invention relates to an apparatus for helping to protect a vehicle occupant in a vehicle collision, and is particularly directed to an apparatus for directing the flow of inflation fluid into an inflatable vehicle occupant protection device, or air bag.

BACKGROUND OF THE INVENTION

It is known to use an inflatable vehicle occupant protection device, or air bag, to help protect a vehicle occupant in the event of a vehicle collision. The air bag is inflated by inflation fluid from an actuatable air bag inflator. The inflator may include a pyrotechnic gas generant, a stored gas supply, or a combination of stored gas and pyrotechnic material for heating the stored gas. The inflator is actuated in response to a signal indicative of vehicle deceleration of at least a predetermined magnitude. The inflation fluid is then directed from the inflator into the air bag to inflate the air bag.

SUMMARY OF THE INVENTION

The present invention is an apparatus for helping to protect a vehicle occupant in a vehicle collision. The apparatus comprises an inflatable vehicle occupant protection device having a mouth section with a first opening through which inflation fluid flows to inflate the occupant protection device, an inflator for providing the inflation fluid, and a member located between the mouth section of the occupant protection device and the inflator. The member has a second opening for directing the inflation fluid from the inflator into the first opening. The second opening in the member has first and second portions. The second portion of the second opening in the member overlies the first opening in the mouth section of the occupant protection device. Inflation fluid from the inflator thus enters the occupant protection device by flowing through the second portion of the second opening in the member and then through the first opening in the mouth section. The mouth section of the occupant protection device includes a deflector part blocking inflation fluid flow through the first portion of the second opening in the member into the occupant protection device. The deflector part of the mouth section lies adjacent the first opening in the mouth section.

BRIEF DESCRIPTION OF THE DRAWINGS

The foregoing and other features of the present invention will become apparent to those skilled in the art to which the present invention relates upon reading the following description with reference to the accompanying drawings, in which.

DESCRIPTION OF A PREFERRED EMBODIMENT

Figure 1:
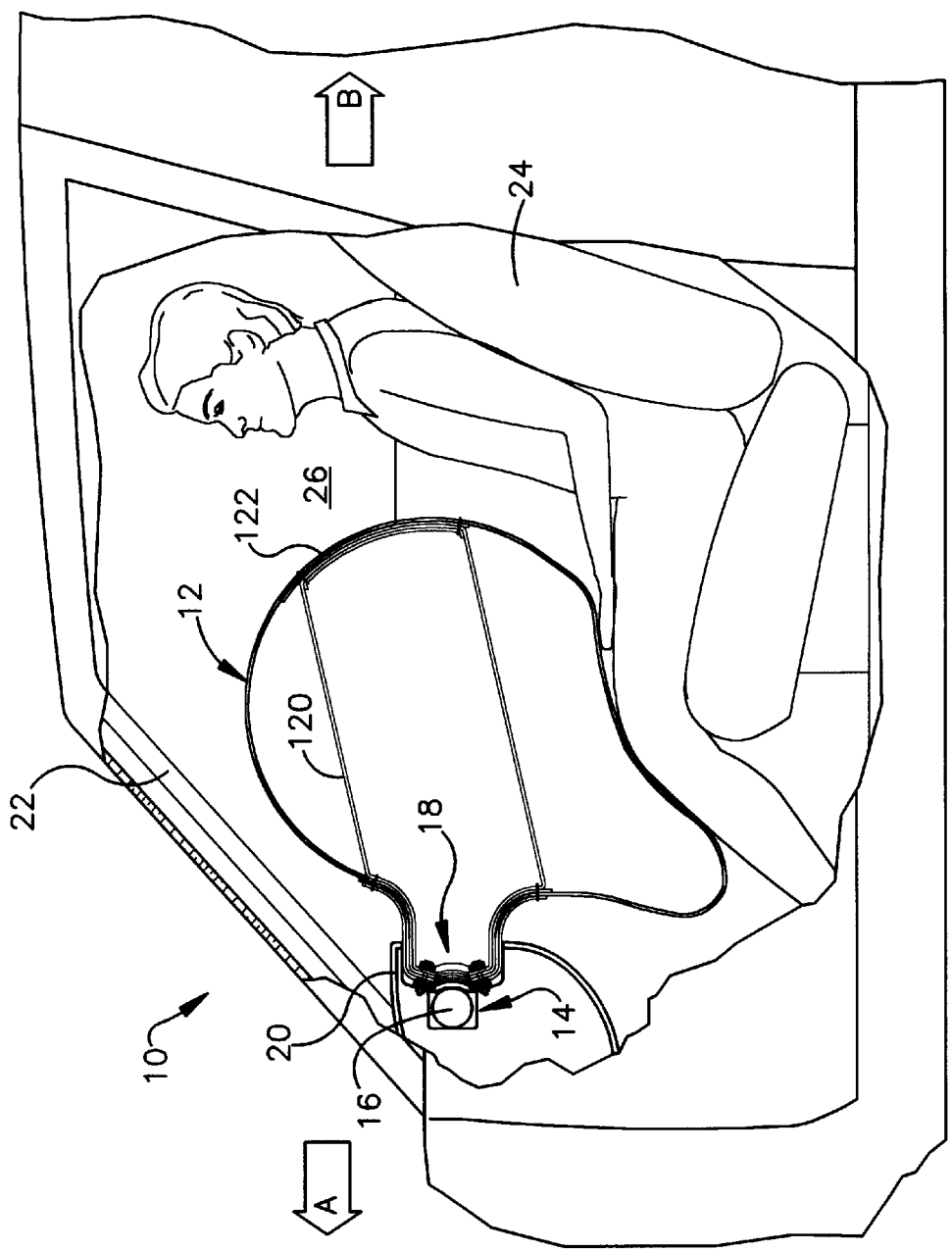
FIG. 1 is a schematic side view of part of a vehicle having an apparatus for helping to protect a vehicle occupant in a vehicle collision, the apparatus being shown in a deployed condition.

The present invention relates to an apparatus for helping to protect a vehicle occupant in a vehicle collision, and is particularly directed to an apparatus for directing the flow of inflation fluid into an inflatable vehicle occupant protection device. As representative of the present invention, FIG. 1 illustrates a vehicle 10 having an inflatable vehicle occupant protection device, of the type known as an air bag, illustrated schematically at 12. The air bag 12 is part of an air bag module 14, which includes an inflation fluid source, such as an inflator 16. Other inflatable vehicle occupant protection devices that can be used in accordance with the present invention include, for example, inflatable seat belts, inflatable knee bolsters, inflatable head liners or side curtains, and knee bolsters operated by inflatable air bags.

Figure 2:
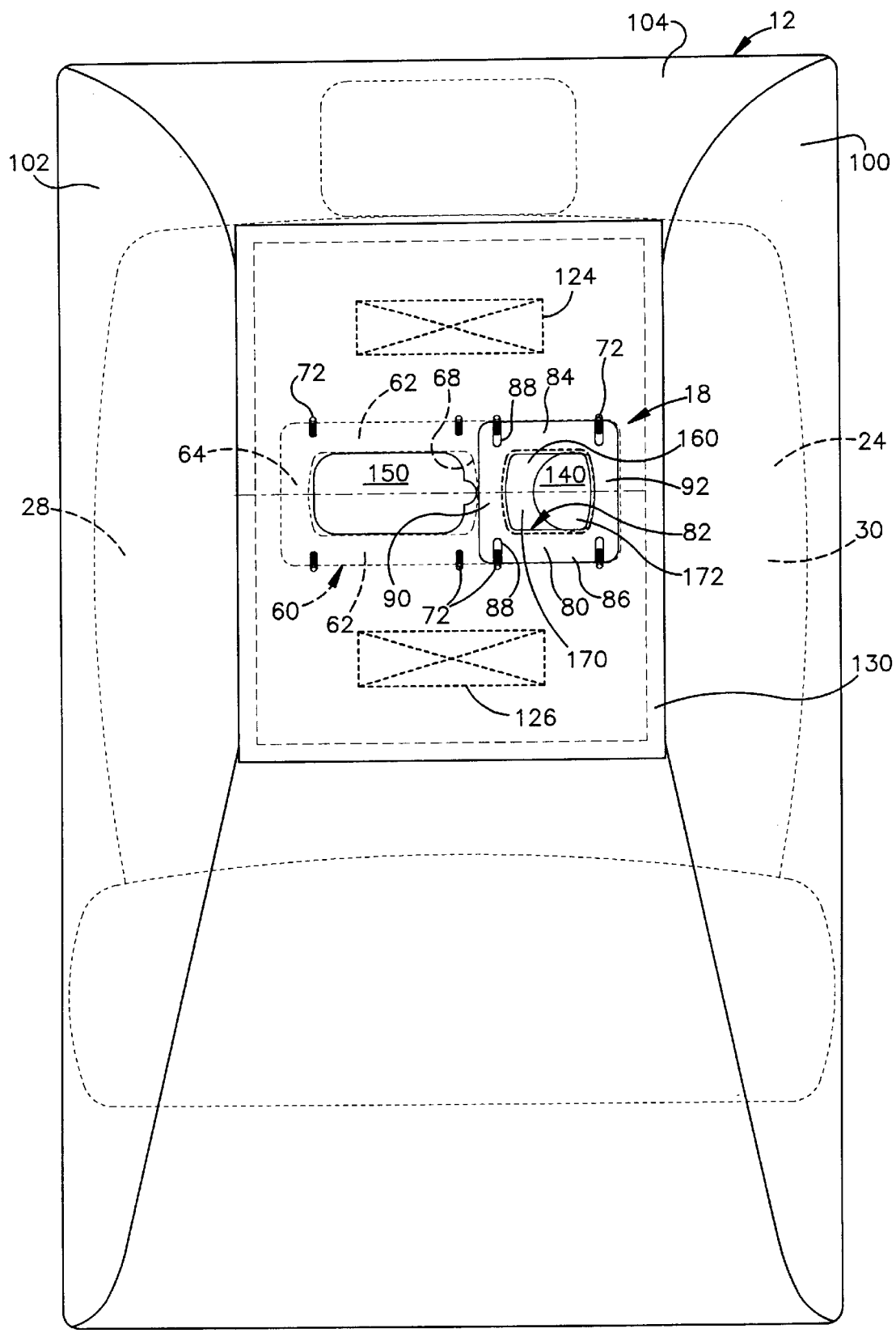
FIG. 2 is a schematic end view of the apparatus shown in FIG. 1.

The vehicle 10 has a forward direction of travel indicated by arrow A and a rearward direction of travel indicated by arrow B. The vehicle 10 includes an instrument panel 20, a passenger side door 22, a passenger seat 24, and a passenger compartment 26 in which the passenger seat is located. The passenger seat 24 has an outboard side 28 (FIG. 2) located adjacent the passenger side door 22 and an inboard side 30 disposed opposite from the outboard side.

The air bag module 14 is mounted in the instrument panel 20 of the vehicle 10. In the event of a vehicle collision, the air bag 12 can deploy into the passenger compartment 26 to restrain movement of a vehicle occupant seated in the passenger seat 24 and thereby help to protect the vehicle occupant from injury. The air bag 12, when filled with inflation fluid from the inflator 16, inflates from a folded and stowed condition (not shown) to the deployed condition shown in FIG. 1.

Figure 4:
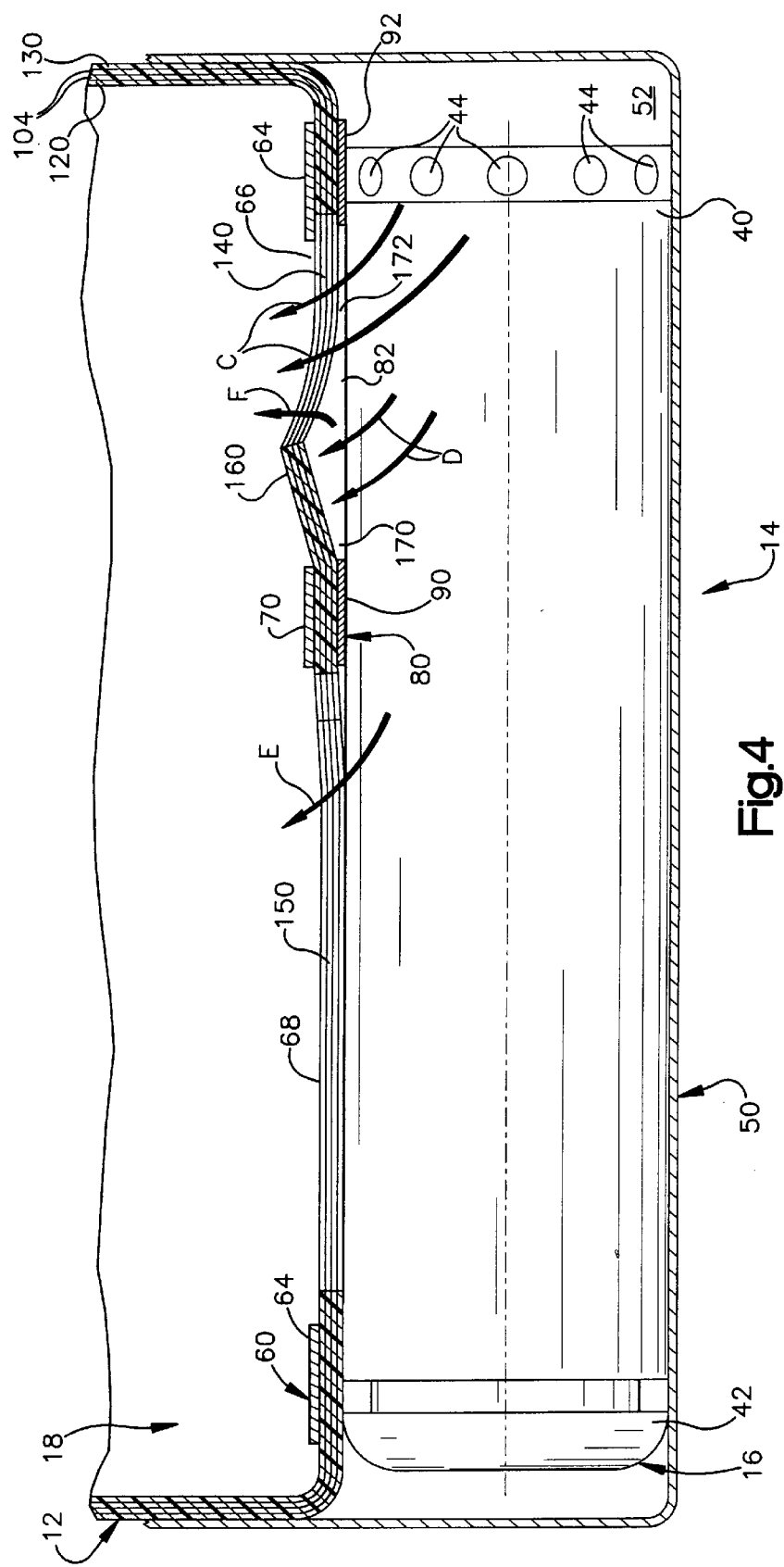
FIG. 4 is a sectional view taken along line 4—4 in FIG. 3.

The inflator 16 illustrated in the Figures is an augment or hybrid inflator. The inflator 16 is generally cylindrical in shape and has oppositely disposed first and second ends 40 and 42, respectively (FIG. 4). Pressurized gas is stored inside the inflator 16. An ignitable material inside the inflator 16, when ignited, heats the stored gas, causing the pressure of the gas to increase. The gas is then released from the inflator 16 through a plurality of fluid exit nozzles 44 arranged in an annular array at the first end 40 of the inflator.

The air bag module 14 further includes a reaction canister 50 (FIGS. 3 and 4), a retaining ring 60, and a heat shield 80. The reaction canister 50 is a rigid metal part having a box-like shape defining an inner chamber 52 and an outer chamber 54. The inflator 16 is secured in a known manner (not shown) in the inner chamber 52. The inflator 16 is positioned in the inner chamber 52 such that the first end 40, which includes the plurality of fluid exit nozzles 44, is nearest the inboard side 30 of the passenger seat 24. The air bag 12, in its folded and stowed condition (not shown), is located in the outer chamber 54 of the reaction canister 50.

Figure 3:
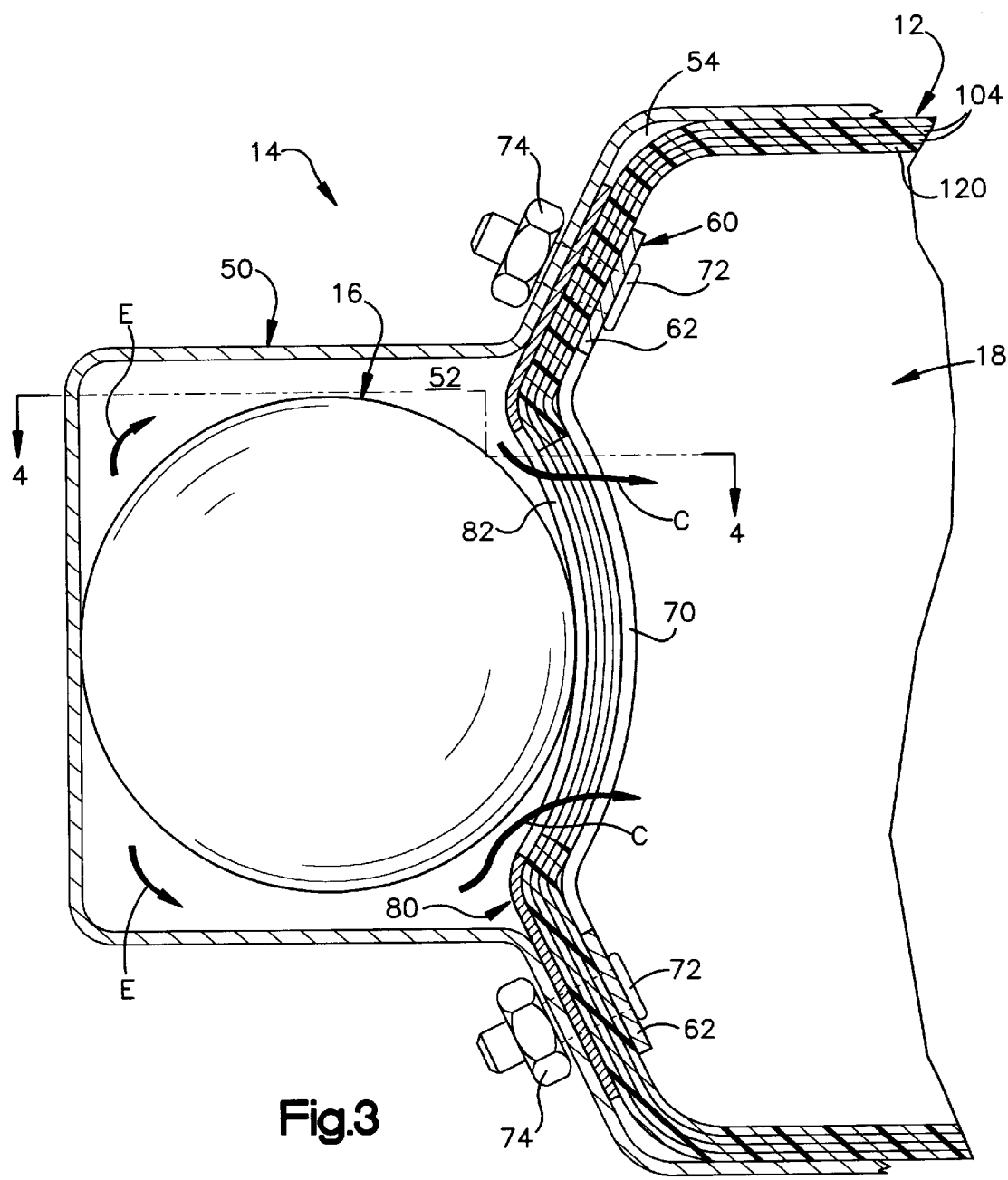
FIG. 3 is an enlarged view, taken partially in section, of a portion of the apparatus shown in FIG. 1.

The retaining ring 60 is a metal part positioned inside the air bag 12 in a mouth section 18 of the air bag. The retaining ring 60 has a rectangular shape defined by a pair of parallel major side portions 62 (FIG. 2) and a pair of transversely extending minor side portions 64. The retaining ring 60 includes generally rectangular first and second openings 66 and 68, respectively, separated by a transversely extending central portion 70. As best seen in FIG. 3, the central portion 70 and the minor side portions 64 of the retaining ring 60 are bowed away from the inflator 16.

The first opening 66 in the retaining ring 60 lies nearest the inboard side 30 of the passenger seat 24 and is smaller in area than the second opening 68 in the retaining ring. A plurality of mounting studs 72 are attached in a known manner to the major side portions 62 of the retaining ring 60 and project through corresponding apertures (not shown) in the air bag 12. The mounting studs 72 are received in corresponding holes (not shown) in the reaction canister 50. Nuts 74 are tightened on the mounting studs 72 to secure the air bag 12 and the retaining ring 60 to the reaction canister 50.

The heat shield 80 is a rigid metal part which is disposed between the mouth section 18 of the air bag 12 and the inflator 16. The heat shield 80 is generally rectangular in shape and is positioned near the first end 40 of the inflator 16. The heat shield 80 has a rectangular opening 82 (FIG. 2) which overlies the first opening 66 in the retaining ring 60. The heat shield 80 includes upper and lower flanges 84 and 86, respectively, which extend parallel to, and overlie a portion of, the major side portions 62 of the retaining ring 60. The upper and lower flanges 84 and 86 include a plurality of slots 88 for receiving some of the plurality of mounting studs 72 projecting from the retaining ring 60.

The heat shield 80 further includes a first side flange 90 that overlies the central portion 70 of the retaining ring 60 and a second side flange 92 that overlies one of the minor side portions 64 of the retaining ring 60 adjacent the first opening 66 in the retaining ring. The first and second side flanges 90 and 92 of the heat shield 80, like the minor side portions 64 and the central portion 70 of the retaining ring 60, are bowed away from the cylindrical inflator 16.

The air 12 bag comprises first and second circular side panels 100 and 102, respectively, of a fabric material connected by an annular center panel 104 of the same fabric material. Preferably, the fabric material is uncoated 630 Denier Nylon 6/6, but the air bag could alternatively be made of another suitable air bag material. The panels 100, 102, and 104 are sewn together using a double needle lock stitch as is known in the art. The center panel 104 is a loop of the fabric material that overlaps itself in the mouth section 18 of the air bag 12. Thus, there are two layers of the center panel 104 in the mouth section 18 of the air bag 12, as is visible in FIGS. 3 and 4.

The air bag 12 further comprises a tether 120 and a reinforcement layer 130. The tether 120 is made of the air bag fabric material and extends inside the air bag 12 in a loop from the mouth section 18 of the air bag to an oppositely disposed front section 122 (FIG. 1) of the center panel 104, which faces toward the passenger seat 24 in the vehicle 10. The tether 120 is sewn to the center panel 104 at two locations indicated at 124 and 126 in FIG. 2. As is known in the art, when the air bag 12 is inflating, the tether 120 limits the rearward travel of the air bag into the passenger compartment 26.

The reinforcement layer 130 is a rectangular panel made of the air bag fabric material. The reinforcement layer 130 is sewn to the outside of the center panel 104 in the mouth section 18 of the air bag 12 as may be seen in FIG. 2.

The mouth section 18 of the air bag 12 includes first and second openings 140 and 150, respectively, through which inflation fluid from the inflator 16 enters the air bag. The first opening 140 lies nearest the first end 40 of the inflator 16 where the exit nozzles 44 are located. The first opening 140 has an oval shape and is bordered on one side of the oval by one of the minor side portions 64 of the retaining ring 60 and an overlying one of the side flanges 92 of the heat shield 80, as is best seen in FIG. 4. The opposite side of the first opening 140 in the air bag 12 is bordered by a deflector portion 160 of the air bag.

The deflector portion 160 of the air bag 12 separates the first and second openings 140 and 150. Because the first opening 140 in the air bag 12 is smaller than the first opening 66 in the retaining ring 16, the deflector portion 160 also extends between the first opening 140 and the central portion 70 of the retaining ring inside the air bag. When the heat shield 80 is placed over the mouth section 18 of the air bag 12, the deflector portion 160 divides the opening 82 in the heat shield 80 into first and second portions 170 and 172, respectively. The first portion 170 of the opening 82 in the heat shield 80 is covered over by the deflector portion 160 of the air bag 12, while the second portion 172 of the opening in the heat shield overlies the first opening 140 in the air bag. The deflector portion 160 of the air bag 12 blocks off approximately half of the opening 82 in the heat shield 80.

The second opening 150 in the mouth section 18 of the air bag 12 is spaced from the first opening 140 and is separated from the first opening by the deflector portion 160. The second opening 150 is located nearest the second end 42 of the inflator 16 and is aligned with the second opening 68 in the retaining ring 60. The second opening 150 in the air bag 12 is generally rectangular in shape and is substantially larger in cross-sectional area than the first opening 140 in the air bag.

When the inflator 16 is actuated in response to conditions indicative of a vehicle collision, inflation fluid is released from the inflator through the fluid exit nozzles 44 at the first end 40 of the inflator. As indicated by arrows C in FIGS. 3 and 4, the majority of the inflation fluid flows through the second portion 172 of the opening 82 in the heat shield 80 and subsequently through the first opening 140 in the air bag 12. The deflector portion 160 blocks off the first portion 170 of the opening 82 in the heat shield 80. The force of the inflation fluid flow against the deflector portion 160 of the air bag 12 causes the deflector portion to bend slightly inward, as indicated by arrows D in FIG. 4. Most of the inflation fluid which flows against the deflector portion 160 is redirected by the deflector portion to flow into the air bag 12 through the first opening 140 as indicated by arrow F. By blocking off the first portion 170 of the opening 82 in the heat shield 80 and directing the inflation fluid into the air bag 12 through the first opening 140, the deflector portion 160 directs the inflation fluid toward the first side panel 100 of the air bag.

A small percentage of the inflation fluid exiting the fluid nozzles 44 enters the air bag 12 through the second opening 150 in the air bag. This small percentage of the inflation fluid flows axially along the inflator 16 in the chamber 52 in the reaction canister 50 and subsequently enters the air bag 12 through the second opening 150 in the air bag as indicated by arrows E in FIGS. 3 and 4.

From the above description of the invention, those skilled in the art will perceive improvements, changes and modifications. Such improvements, changes and modifications within the skill of the art are intended to be covered by the appended claims.

Having described the invention, I claim:

1. An apparatus for helping to protect a vehicle occupant seated in a passenger seat of a vehicle, the passenger seat having an inboard side and an outboard side, said apparatus comprising:

an inflatable air bag having first and second side panels connected by a center panel, each of said panels being made of a fabric material, said first side panel being disposed closer to the inboard side of the passenger seat and said second side panel being disposed closer to the outboard side of the passenger seat;

an inflator for providing inflation fluid to inflate said air bag, said inflator having oppositely disposed first and second ends, said first end of said inflator having a plurality of fluid nozzles;

said center panel of said air bag having first and second openings for directing inflation fluid from said inflator into said air bag, said first opening being located adjacent said first end of said inflator where said fluid nozzles are located, said second opening being located adjacent said second end of said inflator; and a heat shield interposed between said center panel of said air bag and said inflator, said heat shield having a third opening overlying said first opening in said center panel;

said center panel of said air bag further including a fluid deflecting portion formed from a section of said fabric material, said fluid deflecting portion adjoining said first opening and extending across a portion of said third opening in said heat shield, said fluid deflecting portion blocking inflation fluid flow through a portion of said third opening and directing inflation fluid to flow through said first opening toward said first side panel of said air bag.

2. An apparatus for helping to protect a vehicle occupant in a vehicle collision, said apparatus comprising:

an inflatable vehicle occupant protection device having a mouth section with a first opening through which inflation fluid flows to inflate said occupant protection device;

an inflator for providing said inflation fluid; and a member located between said mouth section of said occupant protection device and said inflator, said member having a second opening for directing said inflation fluid from said inflator into said first opening, said second opening having first and second portions;

said second portion of said second opening in said member overlying said first opening in said mouth section of said occupant protection device so that inflation fluid from said inflator enters said occupant protection device by flowing through said second portion of said second opening in said member and through said first opening in said mouth section;

said mouth section of said occupant protection device including a deflector part blocking inflation fluid flow through said first portion of said second opening in said member into said occupant protection device, said deflector part of said mouth section lying adjacent said first opening in said mouth section, said inflator having oppositely disposed first and second ends, said first end of said inflator having a plurality of fluid nozzles located adjacent said second opening in said member, said mouth section of said occupant protection device including a third opening through which a small percentage of the total amount of inflation fluid flows to inflate said occupant protection device, said third opening being spaced from said first opening and being located adjacent said second end of said inflator.

3. An apparatus for helping to protect a vehicle occupant in a vehicle collision, said apparatus comprising:

an inflatable vehicle occupant protection device having a mouth section with a first opening through which inflation fluid flows to inflate said occupant protection device;

an inflator for providing said inflation fluid; and a member located between said mouth section of said occupant protection device and said inflator, said member having a second opening for directing said inflation fluid from said inflator into said first opening, said second opening having first and second portions;

said second portion of said second opening in said member overlying said first opening in said mouth section of said occupant protection device so that inflation fluid from said inflator enters said occupant protection device by flowing through said second portion of said second opening in said member and through said first opening in said mouth section;

said mouth section of said occupant protection device including a deflector part blocking inflation fluid flow through said first portion of said second opening in said member into said occupant protection device, said deflector part of said mouth section lying adjacent said first opening in said mouth section, said member comprising a heat shield made of metal.

4. An apparatus for helping to protect a vehicle occupant in a vehicle collision, said apparatus comprising:

an inflatable vehicle occupant protection device having a mouth section with a first opening through which inflation fluid flows to inflate said occupant protection device;

an inflator for providing said inflation fluid; and a member located between said mouth section of said occupant protection device and said inflator, said member having a second opening for directing said inflation fluid from said inflator into said first opening, said second opening having first and second portions;

said second portion of said second opening in said member overlying said first opening in said mouth section of said occupant protection device so that inflation fluid from said inflator enters said occupant protection device by flowing through said second portion of said second opening in said member and through said first opening in said mouth section;

said mouth section of said occupant protection device including a deflector part blocking inflation fluid flow through said first portion of said second opening in said member into said occupant protection device, said deflector part of said mouth section lying adjacent said first opening in said mouth section; and a reaction canister having a chamber in which said inflator is mounted.

5. The apparatus of claim 4 further comprising a retaining ring located inside said occupant protection device and encircling said first opening, said retaining ring including a plurality of mounting studs projecting though a corresponding plurality of apertures in said occupant protection device surrounding said first opening, said plurality of studs being attached to said reaction canister to secure said occupant protection device to said reaction canister.

* * * * *